United States Patent Office 2,961,328
Patented Nov. 22, 1960

2,961,328

REFRACTORY GLASS COMPOSITION

Clarence L. Babcock and Murray McDavitt, Toledo, Ohio, assignors to Owens-Illinois Glass Company, a corporation of Ohio No Drawing. Filed Dec. 2, 1958, Ser. No. 777,592

12 Claims. (Cl. 106—52)

This invention relates to refractory glass compositions applicable to usage in severe environmental conditions and more specifically to glasses resistant to damage by exposure to high temperatures and/or high energy particles over prolonged periods. The subject glasses having high softening points are especially useful for electronic applications in high temperature resisting tube envelopes and substrates.

Previously the most common glasses for discharge lamp and electronic tube envelopes have been comprised of lead-containing compositions combining the properties of ease of working with high electrical resistivity. Some of these compositions contain as much as 30% lead oxide and have softening point temperatures barely exceeding 900° C. The electronic industry in conjunction with military requirements has now raised a demand for glasses having still higher softening points and structural resistivity to most severe environments. One of the objects of this invention is to meet this demand.

Normally, elevation of the softening point temperature necessarily involves raising the liquidus temperature of the glasses to secure their proper melting. We have found that alumino-silicate glasses containing calcium and magnesium oxides in substantially the dolomitic limestone ratio provide compositions having softening points up to 1050° C. Further we have found that these glasses are capable of being melted at about 1600° C., a temperature which is still within melting limits possible with commercial continuous tank furnaces.

Accordingly, it is an object of this invention to provide refractory glasses having softening point temperatures of the order of 1000° C. and not less than 950° C., the compositions being adapted to melting temperatures in the range of 1500° to 1600° C. The subject glasses are essentially alkali-free consisting basically of the three constituents silica, alumina and dolomitic limestone and, in one form, contain only small amounts of prescribed modifying constituents to improve melting, fining and/or forming without deleterious loss of desirable properties, or, in another form, contain substantially no other constituents.

It is a further object of this invention to provide high softening point glasses which are applicable to high operating temperature uses and are extremely resistant to nuclear radiation damage.

Another object of this invention is to provide refractory glasses applicable to elevated temperature applications for electronic tube envelopes and vitreous substrates and the like which glasses are capable of withstanding both exposure to high temperatures and high energy particles for lengthy periods without adverse effects thereupon.

A still further object of this invention is to provide generally alkali-free alumina-silica-dolomitic limestone glasses having high softening point temperatures and sufficiently low liquidus temperatures to facilitate end forming demands as well as suitable chemical and electrical properties for electronic application.

The specific nature of this invention, as well as other objects and advantages thereof, will become apparent to those skilled in the art from the following detailed description of the preferred embodiments of this invention.

It has been found that higher softening points can be obtained by the subject alumina-silica-dolomitic limestone glasses based on the composition of about 61% $SiO_2$; 19% $Al_2O_3$; and 20% $CaO \cdot MgO$ as dolomitic limestone, and that such glass compositions exhibit melting and forming properties suitable for use as high temperature envelopes. The subject glasses exhibit improved resistance to nuclear radiation damage as evidenced by tests conducted in a nuclear reactor. The glasses also have apparently good properties of out-gassing to permit bake-out and thermal cycling to provide vacuum-tight envelopes, for example. The glasses are also resistant to severe vibration as well as thermal and physical shock. The glasses appear useful for the production of electronic tube envelopes for supersonic air and space vehicles carrying high yield weapons, which field has demanded a new glass to meet increasingly severe conditions.

The improved glasses disclosed herein contain essentially 54 to 65% $SiO_2$; 15 to 22% $Al_2O_3$; 7 to 30% $CaO \cdot MgO$; in substantially the dolomitic-limestone ratio, 0 to 10% $BaO$; 0 to 10% $PbO$; 0 to 6% $B_2O_3$; 0 to 3% $ZnO$; 0 to 3% $TiO_2$; and 0 to 3% $Na_2O$; and 0 to 3% $K_2O$. Generally, the glasses may be defined as alkali-free dolomitic glasses containing the following ranges of primary constituents: about 54 to 65% $SiO_2$; 15 to 22% $Al_2O_3$; and 7 to 30% $CaO \cdot MgO$ in the dolomitic limestone ratio. While the subject glasses are referred to as being essentially alkali-free, it is permissible to incorporate a small amount of one or more alkali metals to improve the working or melting properties of the glass or to obtain desired properties.

Glasses made in accordance with the present invention indicate properties of high electrical resistance, low electrical losses, good chemical and neutron resistance and high softening point temperatures.

Glasses having the composition of essentially 61% $SiO_2$; 19% $Al_2O_3$; and 20% $CaO \cdot MgO$ as dolomite have properties suitable for use as high temperature envelopes. The composition of 63% $SiO_2$; 21.5% $Al_2O_3$; and 15.5% $CaO \cdot MgO$ as dolomite exhibits properties suitable for use as high temperature substrates or high temperature envelopes. The substitution of 0 to 10% $BaO$, primarily for a portion of the $CaO \cdot MgO$, for example, provides some improvement in the refining of the glass. Also introducing either barium or the calcium into the melt as a sulphate offers refining improvement.

The compositional range and physical properties of the glasses according to the invention are set forth in the following table. Batch constituents for preparing the given typical compositions are also set forth in the table. Other constituents may be employed as necessary or desired to attain the prescribed chemical analyses.

Table I

|  | A | B | C | D | E |
|---|---|---|---|---|---|
| $SiO_2$ | 61.5 | 61.4 | 63.7 | 63.7 | 62.2 |
| $Al_2O_3$ | 18.8 | 19.0 | 21.7 | 21.5 | 15.9 |
| $CaO \cdot MgO$ | 19.7 | 9.5 | 7.3 | 7.3 | 19.5 |
| $BaO$ |  | 10.1 | 7.3 |  |  |
| $PbO$ |  |  |  | 7.3 | 2.5 |
| Liq. Temp. ° C | 1,235 | 1,240 | 1,380 | 1,455 | 1,210 |
| F.S.P. Temp. ° C | 970 | 1,040 | 1,065 | 1,045 | 950 |
| Ann. Pt. Temp. ° C | 775 | 790 | 815 | 775 | 750 |
| Coeff. of Exp. ($\times 10^{-7}$ cm./cm./° C.) | 42 | 37 | 31 | 26 | 45 |
| Elec. Rest. Log. (@ 400° C.) | 11.5 | 10.3 | 10.0 | 9.3 | 11.2 |
| Dielectric Constant | 6.3 | 6.2 | 5.6 | 5.5 | 6.2 |
| Power Factor | 0.10 | 0.29 | 0.15 | 0.13 | 0.10 |
| Batch Constituents (parts by wt.): |  |  |  |  |  |
| Flint Sand | 1,229 | 1,222 | 1,222 | 1,244 | 1,211 |
| Alumina | 377 | 379 | 429 | 429 | 317 |
| Dolomitic Limestone | 404 | 207 | 155 | 155 | 414 |
| Barium carbonate |  | 221 | 193 |  |  |
| Barium Sulfate |  | 44 |  |  |  |
| Lead Silicate |  |  |  | 184 | 26 |
| Ammonium Sulfate | 25 |  | 30 | 30 | 25 |

Glass A indicates a preferred composition according to the invention, the glass being comprised of silica, alumina, dolomitic limestone and substantially no other constituents. Glasses B and C indicate a portion of the CaO·MgO being substituted therefor by BaO. Glasses D and E indicate examples of the CaO·MgO and $Al_2O_3$ respectively being substituted for by PbO.

Table II below indicates the basic silica-alumina-dolomite glass A wherein portions of the CaO·MgO have been substituted for by $B_2O_3$, ZnO, $TiO_2$, $Na_2O$, and $K_2O$ in glasses F through J respectively.

Table II

|  | F | G | H | I | J |
|---|---|---|---|---|---|
| $SiO_2$ | 61.6 | 60.0 | 61.8 | 61.4 | 61.2 |
| $Al_2O_3$ | 19.1 | 19.2 | 19.1 | 18.7 | 19.4 |
| $CaO \cdot MgO$ | 16.4 | 17.5 | 16.2 | 16.2 | 16.5 |
| $B_2O_3$ | 2.7 |  |  |  |  |
| ZnO |  | 3.2 |  |  |  |
| $TiO_2$ |  |  | 2.9 |  |  |
| $Na_2O$ |  |  |  | 2.9 |  |
| $K_2O$ |  |  |  |  | 2.6 |
| Liq. Temp. ° C | 1,215 | 1,250 | 1,230 | 1,270 | 1,270 |
| F.S.P. Temp. ° C | 970 | 975 | 970 | 960 | 975 |
| Ann. Pt. Temp. ° C | 760 | 765 | 765 | 710 | 770 |
| Coeff. of Exp. ($\times 10^{-7}$ cm./cm./° C.) | 38 | 40 | 40 | 48 | 45 |
| Elect. Rest. Log (@ 400° C.) | 11.0 | 11.2 | 11.2 | 7.3 | 10.3 |
| Dielectric Constant | 5.9 | 6.2 | 6.1 | 6.6 | 6.5 |
| Power Factor | 0.12 | 0.11 | 0.09 | 0.59 | 0.31 |
| Batch Constituents (parts by wt.): |  |  |  |  |  |
| Flint Sand | 1,222 | 1,222 | 1,222 | 1,222 | 1,222 |
| Alumina | 377 | 377 | 377 | 377 | 377 |
| Dolomitic Limestone | 352 | 352 | 352 | 352 | 352 |
| $B_2O_3$ Anhydrous | 62 |  |  |  |  |
| Ammonium Sulfate | 25 | 25 | 25 | 25 | 25 |
| Titanox |  |  | 60 |  |  |
| Zinc Oxide |  | 60 |  |  |  |
| Niter |  |  |  | 100 |  |
| Soda Ash |  |  |  | 41 |  |
| Calcined Potash |  |  |  |  | 91 |

All of the subject glasses have coefficients of thermal expansion (0–300° C.) ranging from 26–60 $\times 10^{-7}$ cm. per cm. per ° C., a liquidus temperature ranging from about 1200° to 1460° C., a softening point temperature not less than 950° C., an annealing point temperature ranging from about 700° to 820° C. and an approximate strain point temperature ranging from about 670° to 790° C. The glasses exhibit electrical properties wherein the log of the resistivity (measured at 400° C.) ranges from about 6.0 to 11.4, the dielectric constant from about 5.3 to 6.7 and the power factor from about 0.001 to 0.007, the latter two being measured at 20° C.

The subject glass compositions may contain 60 to 65% silica, about 18 to 22% alumina, about 16 to 20% dolomitic limestone and substantially no other constituents in one preferred form of the invention as indicated by glass A. One example of the glass as analyzed contains 61% silica, 19% alumina and about 20% dolomitic limestone and has a liquidus temperature of about 1235° C., a fibrous softening point of about 790° C., an annealing point temperature of about 775° C., and a coefficient of thermal expansion (0–300° C.) of about $42 \times 10^{-7}$ cm. per cm. per ° C.

In still another form of the invention the glass composition has been analyzed as 61.4% silica, 18.8% alumina, about 11.5% calcium oxide and about 8.2% magnesium oxide, the latter two constituents being present in essentially the dolomitic limestone ratio. Calcium and magnesium oxides are normally present in the ratio of 1.4 to 1 in dolomitic limestone.

The glass may also be comprised of 60 to 65% silica, about 18 to 22% alumina, about 7 to 30% calcium and magnesium oxides in substantially the dolomitic limestone ratio with about 0 to 10% barium oxide or lead oxide substituting for a portion of the calcium and magnesium oxides.

Thermal tests of the subject glasses and specifically glass "A" have shown their resistivity to ambient temperatures as high as 750° C. for periods of 12 hours. Rod shaped specimens of glass "A" having dimensions of ⅛ inch in diameter by ½ inch long have been retained at 500° C. for a period of six months without visible change in appearance and with little or no deformation. Thus, the general refractory nature of the glasses for long usage at temperatures up to 500° C. has been evidenced thereby.

Samples of glass "A" consisting of both open-ended cylinders and cylindrical tubes closed at one end have been exposed to neutrons in the Brookhaven, N.Y., nuclear reactor. The samples were exposed to a total integrated dose of about $88 \times 10^{+17}$ nvt. (neutrons per cm.$^2$) (slow neutron flux>>>fast neutron flux). After exposure the samples were severely colored to a dark amber which coloration has been found in other irradiated borosilicate glasses. Optical examination of the samples using a microscope of high resolution indicated that no cracks or fissures were present in the samples. No distortions whatsover appeared in the samples. The cylinders were tested for leaks with a helium leak detector and found to be leak free.

Previously, the best available information has indicated that due to heat liberated by the neutron-gamma reaction on boron in borosilicate glasses fractures and fissures can and do occur. Thus, the subject essentially alkali-free glass "A" has shown improved resistance to high energy particles and its applicability to high temperature uses.

Various other modifications may be resorted to within the spirit and scope of the appended claims.

We claim:

1. A refractory glass composition for high temperature application which is resistant to damage by exposure to high energy particles consisting essentially of about 54 to 65% silicon dioxide, about 15 to 22% aluminum oxide, about 7 to 30% calcium and magnesium oxides in essentially the dolomitic limestone ratio, and a significant amount of a constituent selected from the following: about up to 10% barium oxide, about up to 10% lead oxide, about up to 6% boric oxide, about up to 3% zinc oxide, about up to 3% titanium dioxide, about up to 3% sodium oxide and about up to 3% potassium oxide, the said glass composition having a coefficient of thermal expansion (0°–300° C.), ranging from about 26 to $60 \times 10^{-7}$ cm. per cm. per ° C., a liquidus temperature ranging from about 1200° to 1460° C. and a softening point temperature not less than 950° C.

2. The refractory glass composition in accordance with claim 1, wherein said composition has a logarithmic resistivity (@ 400° C.) ranging from about 6.0 to 11.4, a dielectric constant ranging from about 5.3 to 6.7, and a power factor ranging from about 0.001 to 0.007.

3. A refractory glass composition for high temperature application which is resistant to damage by exposure to high energy particles containing about 60 to 65% silica, about 18 to 22% alumina, and about 16 to 20% dolomitic limestone, and containing substantially no other constituents.

4. A refractory glass composition containing about 61% silica, about 19% alumina and about 20% dolomitic limestone and containing substantially no other constituents, said composition having a liquidus temperature of about 1235° C., a fiber softening point temperature of about 970° C., an annealing point temperature of about 775° C., and a coefficient of thermal expansion (0°–300° C.) of about $42 \times 10^{-7}$ cm. per cm. per ° C.

5. A refractory glass composition containing about 61.5% silica, about 18.8% alumina, about 11.5% calcium oxide and about 8.2% magnesium oxide, the latter two in essentially the dolomitic limestone ratio, and containing substantially no other constituents, said composition having a liquidus temperature of about 1235° C., a fiber softening point temperature of about 970° C., an annealing point temperature of about 775° C., and a coefficient of thermal expansion (0°–300° C.) of about $42 \times 10^{-7}$ cm. per cm. per ° C.

6. A refractory glass composition containing about 63.7% silica, about 21.7% alumina, about 7.3% calcium and magnesium oxides in essentially the dolomitic limestone ratio, about 7.3% barium oxide, and containing substantially no other constituents, said composition having a liquidus temperature of about 1380° C., a fiber softening point temperature of about 1065° C., an annealing point temperature of about 815° C., and a coefficient of thermal expansion (0°–300° C.) of about $31 \times 10^{-7}$ cm. per cm. per ° C.

7. A refractory glass composition containing about 61.4% silica, about 19.0% alumina, about 9.5% calcium and magnesium oxides in essentially the dolomitic limestone ratio, about 10.1% barium oxide and containing substantially no other constituents, said compositions having a liquidus temperature of about 1240° C., a fiber softening point temperature of about 1040° C., an annealing point temperature of about 790° C., and a coefficient of thermal expansion (0°–300° C.) of about $37 \times 10^{-7}$ cm. per cm. per ° C.

8. A refractory glass composition containing about 63.7% silica, about 21.5% alumina, about 7.3% calcium and magnesium oxides in essentially the dolomitic limestone ratio, about 7.3% lead oxide, and containing substantially no other constituents, said composition having a liquidus temperature of about 1455° C., a fiber softening point temperature of about 1050° C., an annealing point temperature of about 775° C., and a coefficient of thermal expansion (0°–300° C.) of about $26 \times 10^{-7}$ cm. per cm. per ° C.

9. A refractory glass composition for electronic tube envelopes and like uses consisting essentially of about 60 to 65% silica, about 18 to 22% alumina, about 7 to 30% calcium and magnesium oxides in substantially the dolomitic limestone ratio, and about 0 to 10% of a constituent selected from the group consisting of barium oxide and lead oxide, the said composition being resistant to nuclear radiation damage and having a liquidus temperature ranging from 1200 to 1460° C., a softening point temperature not less than 950° C. and a coefficient of thermal expansion ranging from 26 to $60 \times 10^{-7}$ cm. per cm. per ° C.

10. A refractory glass composition for high temperature application which is resistant to damage by exposure to high energy particles containing about 54 to 65% silicon dioxide, about 15 to 22% aluminum oxide, about 7 to 30% calcium and magnesium oxides in essentially the dolomitic limestone ratio, about 0 to 10% barium oxide, about 0 to 10% lead oxide, about 0 to 6% boric oxide, about 0 to 3% zinc oxide, about 0 to 3% titanium dioxide, about 0 to 3% sodium oxide and about 0 to 3% potassium oxide, the said glass composition having a coefficient of thermal expansion (0°–300° C.), ranging from about 26 to $60 \times 10^{-7}$ cm. per cm. per ° C., a liquidus temperature ranging from about 1200° to 1460° C. and a softening point temperature not less than 950° C.

11. A refractory glass composition for electronic tube envelopes and like uses containing about 60 to 65% silica, about 18 to 22% alumina, about 7 to 30% calcium and magnesium oxides in substantially the dolomitic limestone ratio, and about 0 to 10% of a constituent selected from the group consisting of barium oxide and lead oxide, the said composition being resistant to nuclear radiation damage and having a liquidus temperature ranging from 1200 to 1460° C., a softening point temperature not less than 950° C. and a coefficient of thermal expansion ranging from 26 to $60 \times 10^{-7}$ cm. per cm. per ° C.

12. A refractory glass composition for high temperature application which is resistant to damage by exposure to high energy particles, consisting essentially of about 54 to 65% silica, about 15 to 22% alumina, and about 7 to 30% calcium and magnesium oxides in the essentially dolomitic limestone ratio.

References Cited in the file of this patent

UNITED STATES PATENTS

| | | |
|---|---|---|
| 2,056,926 | Krefft | Oct. 6, 1936 |
| 2,144,943 | Sharp | Jan. 24, 1939 |
| 2,199,856 | Patridge | May 7, 1940 |
| 2,527,693 | Armistead | Oct. 31, 1950 |
| 2,664,359 | Dingledy | Dec. 29, 1953 |
| 2,669,807 | Smith | Feb. 23, 1954 |
| 2,779,136 | Hood et al. | Jan. 29, 1957 |
| 2,808,492 | Yohe | Oct. 1, 1957 |